United States Patent
Ellum et al.

(10) Patent No.: US 10,609,568 B2
(45) Date of Patent: Mar. 31, 2020

(54) SYSTEM AND METHOD FOR DETERMINING AZIMUTH OF A SOURCE OF AN INTERFERING SIGNAL USING A BEAM STEERING ANTENNA

(71) Applicant: NovAtel Inc., Calgary (CA)

(72) Inventors: Cameron Ellum, Calgary (CA); Thomas Morley, Calgary (CA); Paul Alves, Calgary (CA)

(73) Assignee: NovAtel Inc., Calgary, Alberta (CA)

( * ) Notice: Subject to any disclaimer, the term of this patent is extended or adjusted under 35 U.S.C. 154(b) by 245 days.

(21) Appl. No.: 15/477,804

(22) Filed: Apr. 3, 2017

(65) Prior Publication Data

US 2018/0288627 A1 Oct. 4, 2018

(51) Int. Cl.
*H04W 16/28* (2009.01)
*H01Q 25/00* (2006.01)
*H01Q 3/26* (2006.01)
*H04B 7/08* (2006.01)

(52) U.S. Cl.
CPC .......... *H04W 16/28* (2013.01); *H01Q 3/2611* (2013.01); *H01Q 25/002* (2013.01); *H04B 7/086* (2013.01)

(58) Field of Classification Search
CPC ..... H04W 16/28; H04B 7/086; H01Q 3/2611; H01Q 25/002
USPC ........................................................ 342/354
See application file for complete search history.

(56) References Cited

U.S. PATENT DOCUMENTS

| | | | |
|---|---|---|---|
| 4,791,428 A * | 12/1988 | Anderson | H01Q 3/02 343/757 |
| 5,323,322 A | 6/1994 | Mueller et al. | |
| 5,361,073 A | 11/1994 | Hansen | |
| 5,940,026 A | 8/1999 | Popeck | |
| 5,995,044 A | 11/1999 | Kunysz et al. | |
| 6,018,315 A | 1/2000 | Ince et al. | |
| 6,128,557 A | 10/2000 | Fenton et al. | |
| 6,445,354 B1 | 9/2002 | Kunysz | |
| 6,452,543 B1 | 9/2002 | Tseng et al. | |

(Continued)

FOREIGN PATENT DOCUMENTS

| | | | | |
|---|---|---|---|---|
| CA | 2846096 A1 * | 3/2013 | ............. | G01S 19/43 |
| WO | WO-2013043741 A1 * | 3/2013 | ........... | H01Q 3/2617 |

OTHER PUBLICATIONS

Perkins et al., Antenna Characterization for UAV Based GPS Jammer Localization, Proceedings of the 28th International Technical Meeting of the Satellite Division of the Institute of Navigation (ION GNSS+ 2015), 12 pages.

*Primary Examiner* — Harry K Liu
(74) *Attorney, Agent, or Firm* — Cesari and McKenna, LLP

(57) ABSTRACT

A system determines the azimuth of a source of an interfering signal. The system steers a first null beam in the direction of transmitting device and also steers a second null beam in the direction of the interfering source producing and providing the interfering signal. The system measures an angle to the first null beam. The system also measures an angle to the second null beam. The system calculates the azimuth of the antenna based on the measured angle to the first null beam and a known absolute bearing of the transmitting device. The system calculates the azimuth of the interfering source based on the measured angle to the second null beam and the previously calculated azimuth of the antenna.

25 Claims, 4 Drawing Sheets

(56) References Cited

U.S. PATENT DOCUMENTS

| | | |
|---|---|---|
| 6,452,560 B2 | 9/2002 | Kunysz |
| 6,459,406 B1 | 10/2002 | Tseng et al. |
| 6,466,177 B1 | 10/2002 | Kunysz |
| 6,598,009 B2 | 7/2003 | Yang |
| 6,727,846 B1 * | 4/2004 | Brown .................... G01S 19/22 |
| | | 342/357.63 |
| 6,816,117 B2 | 11/2004 | Fink et al. |
| 6,992,624 B2 | 1/2006 | Feller |
| 8,085,201 B2 | 12/2011 | Ladd et al. |
| 2015/0116147 A1 * | 4/2015 | Jaeckle ................ G01S 19/215 |
| | | 342/357.59 |
| 2018/0103381 A1 * | 4/2018 | Ramamurthi ......... H04W 16/28 |

* cited by examiner

SYSTEM AND METHOD FOR DETERMINING AZIMUTH OF A SOURCE OF AN INTERFERING SIGNAL USING A BEAM STEERING ANTENNA

BACKGROUND

Technical Field

The invention relates generally to global navigation satellite systems (GNSS), and in particular, to a system that determines the azimuth of a source of an interfering signal using a single beam steering antenna.

Background Information

Global navigation satellite systems (GNSS) provide ranging signals that are utilized in applications that determine global positions for surveys, global positions for delivery trucks, global positions for aircraft at and/or approaching airports, and so forth. As is well known, GNSS antennas receive signals from a plurality of GNSS satellites and associated GNSS receivers determine positions based on the timing of codes and carriers in the received GNSS satellite signals. In addition, the GNSS antennas may receive signals of opportunity from a plurality of sources and the associated GNSS receivers may also determine positions based on the known locations of the transmitters of the signals of opportunity and the properties of the received signals of opportunity.

Sources that produce one or more interfering signals may intentionally or unintentionally disrupt the operations of the GNSS receiver and adversely affect position calculations. The interfering source may be, for example, a jamming device (i.e., jammer) producing one or more jamming signals, a reflector producing one or more multipath signals, or a spoofer producing one or more spoofing signals.

Therefore, it would be useful in knowing from what region/location the interfering source is operating, such that the GNSS receiver can avoid, during operation, the region/location of the interfering source. Further, this knowledge may allow the interfering source to be located and disabled.

SUMMARY

The inventive system and method uses a beam steering antenna to determine the azimuth of a source that is producing and providing interfering signals, referred to herein as "an interfering source." Specifically, the system operates to steer a first null beam in the direction of a transmitting device having a known location (e.g., GNSS satellite or a source of a signal of opportunity) based on one or more signals transmitted by the transmitting device. The system measures an angle from an antenna reference direction to the first null beam. The system then calculates the azimuth of the antenna based on the measured angle to the first null beam and a known absolute bearing of the transmitting device. Specifically, the system subtracts the measured angle from the absolute bearing to calculate the azimuth of the antenna.

The system also steers a second null beam in the direction of an interfering source and measures an angle from the antenna reference direction to the second null beam. The system then calculates the azimuth of the interfering source based on the measured angle to the second null beam and the previously calculated azimuth of the antenna. Specifically, the system adds the measured angle and the previously calculated azimuth of the antenna to calculate the azimuth of the interfering source.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
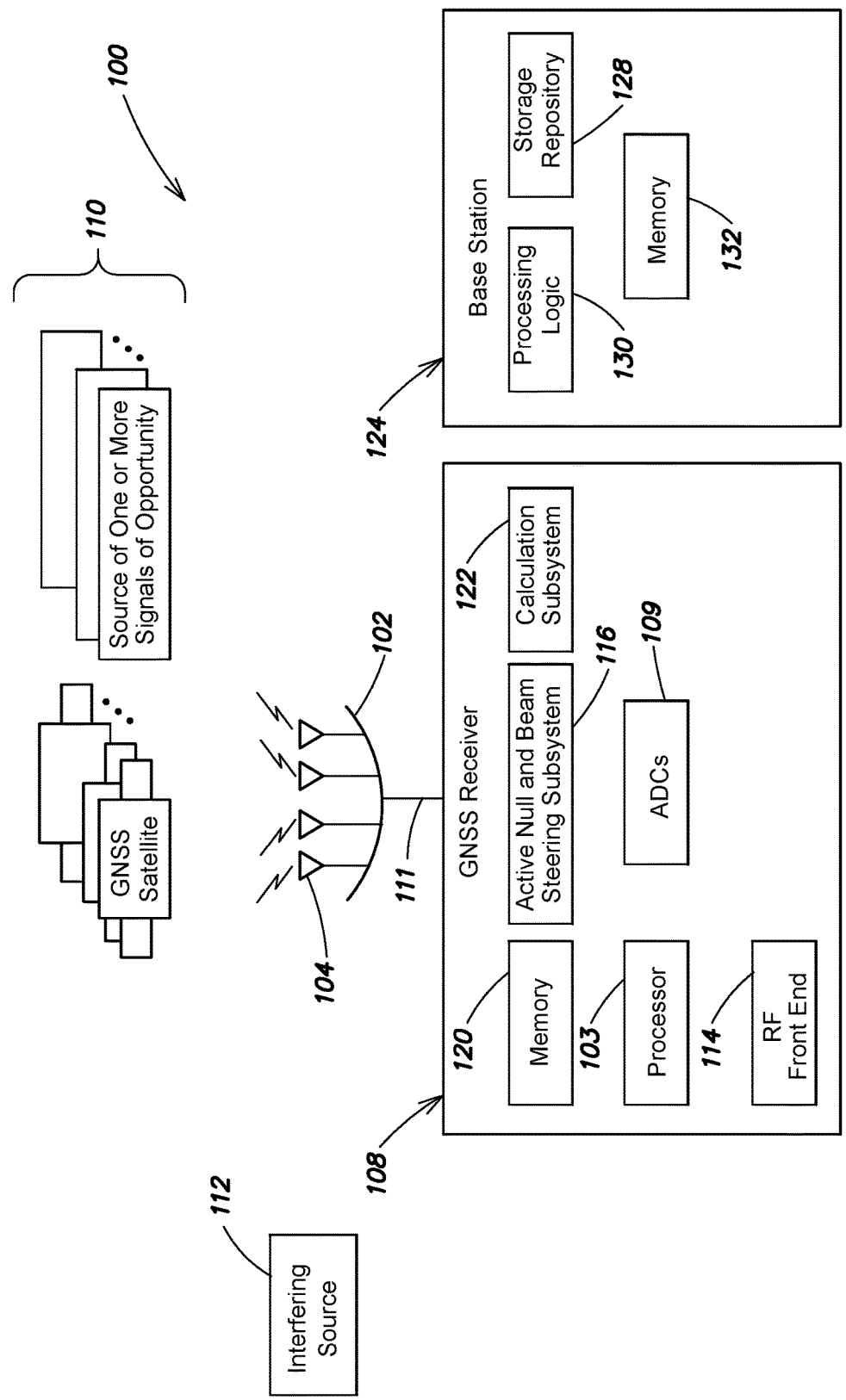
FIG. 1 illustrates a system in accordance with an illustrative embodiment of the invention.

Referring to FIG. 1, a system 100 includes a beam steering antenna 102 with a plurality of antenna elements 104. The antenna 102 receives GNSS satellite signals from one or more GNSS satellites and/or signals of opportunity from one or more sources, wherein the GNSS satellites and the sources of the signals of opportunity are collectively referred to herein as "transmitting devices" 110 and have respective known locations. For example, a source of a signal of opportunity may be, but is not limited to, a radio station (AM/FM, DAB) transmission tower transmitting one or more signals of opportunity or an analog/digital television (DVB) transmission tower transmitting one or more signals of opportunity. In addition, the antenna 102 receives other signals, such as, but not limited to, interfering signals produced by an interfering source 112. The interfering source 112 may be, but is not limited to, a jammer producing one or more jamming signals, a reflector producing one or more multipath signals, and a spoofer producing one or more spoofing signals. The signals received by the antenna elements 104 are provided to a GNSS receiver 108 over a link 111, which may be a bidirectional communication link, as shown in FIG. 1, or alternatively a wireless network (not shown) that operates in a known manner.

In an embodiment, the antenna 102 is a controlled radiation pattern antenna (CRPA) which is essentially leveled. The antenna 102 has a predefined antenna reference direction from which angular measurements are made. For example, the antenna reference direction of the CRPA in the example may be defined by a line from a center element to a given other element and all angular measurements are made with respect to the reference direction. Thus, an angle may be measured from the antenna reference direction to, for example, a null beam steered in a particular direction. If the antenna 102 is not fully leveled, compensation pitch and roll corrections can be utilized to adjust the measured angles using techniques known to those of skill in the art. The orientation of the antenna 102 may be determined utilizing an inertial system (not shown), a tilt sensor (not shown), and/or a variety of different techniques as known by those skilled in the art. The determined orientation can then be utilized to adjust the measured angles using techniques known to those of skill in the art.

The GNSS receiver 108 operates in a known manner and determines positions based on the timing of codes and carriers in the received GNSS satellite signals and/or determines positions based on properties of the received signals of opportunity and the known location of the source of the received signals of opportunity, as described in U.S. Pat. No. 8,085,201, the contents of which are incorporated by reference. The GNSS receiver 108 includes processor logic 103 that is configured to execute an active null and beam steering subsystem 116 and a calculation subsystem 122, to perform the one or more embodiments as described herein. The GNSS receiver 108 may include a memory 120 that may store ephemeris data provided by the GNSS satellites and/or location information for the sources of the signals of opportunity. Further, the memory 120 may store the measured, known, and/or calculated values associated with the one or more embodiments described herein.

The received signals from the antenna elements 104 are provided to a corresponding plurality of channels of an RF front end 114 of the GNSS receiver 108. The RF front end 114 operates in a known manner to filter, amplify and, as appropriate, downconvert the signals. The signals may then be provided to one or more analog to digital converters (ADCs) 109, which operate in a known manner to convert the respective analog signals that are provided by the RF front end 114 to digital signals.

The digital signals are supplied to the active null and beam steering subsystem 116. The active null and beam steering subsystem 116 operates in a known manner and in accordance with a null and beam steering calculation to assign weights to the signals from the respective antenna elements 104 in order to steer a null in the direction of the transmitting device 110 based on one or more signals transmitted by transmitting device 110 and/or the interfering source 112 based on the interfering signal. In an embodiment, the active null and beam steering subsystem 116 calculates the weights using a known technique, which is based on a well-known QR decomposition of the signals received at the respective antenna elements.

The calculation subsystem 122 may implement one or more embodiments described herein. Specifically, and as described in further detail below, the calculation subsystem 122 calculates the azimuth of the antenna 102 and the azimuth of the interfering source 112. The calculated and/or measured values may be transmitted from the GNSS receiver 108 to a base station 124. For example, the calculated and/or measured values may be transmitted from the GNSS receiver 108 to the base station 124 over a wired or wireless network.

The base station 124 may include processing logic 130 and a memory 132 to operate as part of a real time kinematic (RTK) system and/or a Precise Point Positioning (PPP) system. Specifically, the base station 124 may provide correction information to GNSS receivers, as known by those skilled in the art. In addition, the base station 124 may receive the calculated and/or measured values from the GNSS receiver 108 and store the values in a storage repository 128, and additionally broadcast that information or other information to one or more other GNSS receivers. Although the storage repository 128 is shown as being included within the base station 124, it is expressly contemplated that the storage repository 128 may be external to and coupled to the base station 124. For example, the storage repository 128 may be a database, hard disk drives (HDDs), solid-state drives (SSDs), or any of a variety of other data storage devices.

Figure 2:
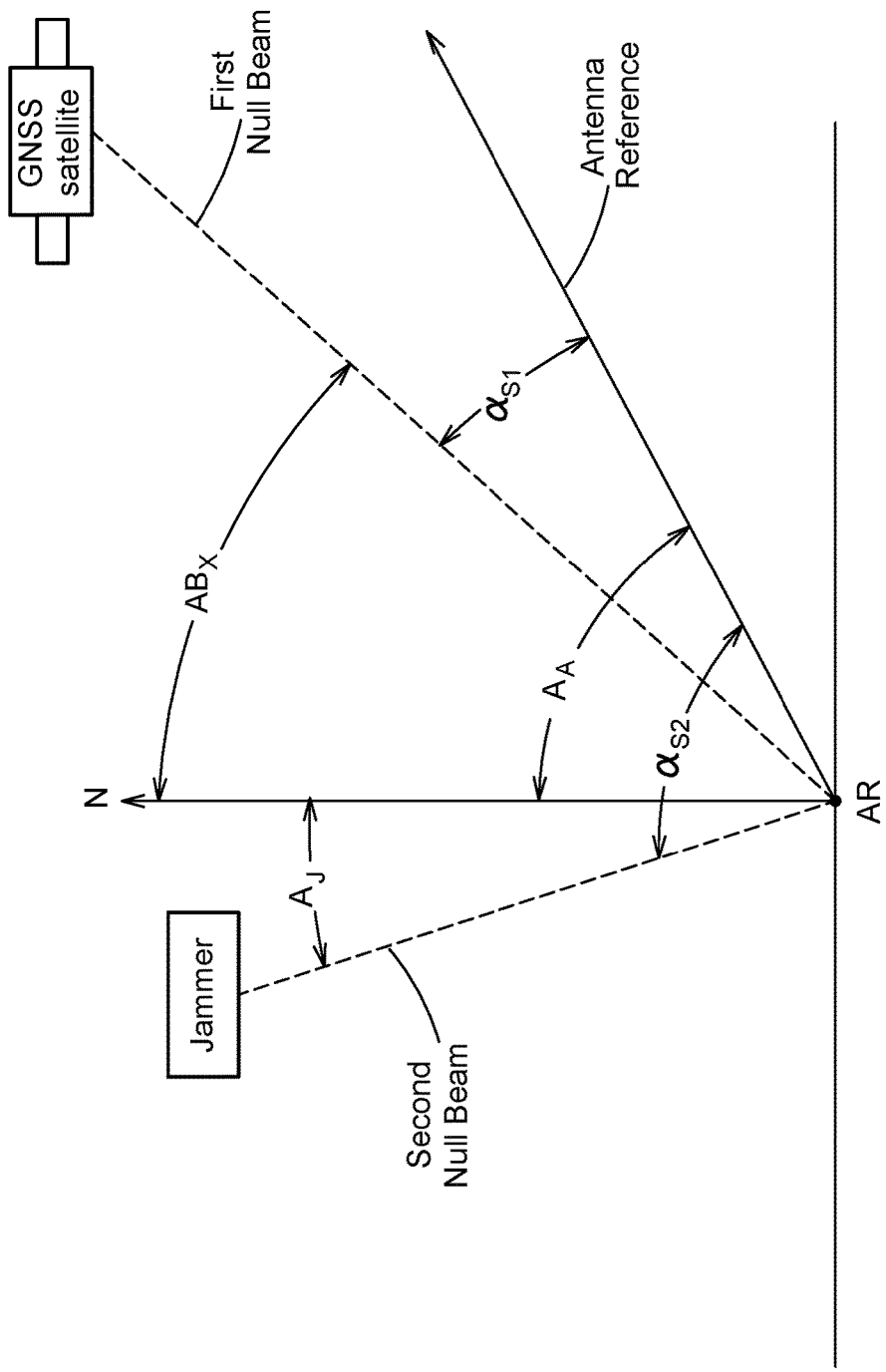
FIG. 2 illustrates an exemplary environment in which the system of FIG. 1 may operate.

FIG. 2 shows an exemplary environment in which the system of FIG. 1 may operate. The antenna 102 coupled to the GNSS receiver 108 is represented as AR in FIG. 2. Further, the antenna reference direction, from which angular measurements are made, is represented by the arrow labeled as "antenna reference." As shown in FIG. 2, an angle between True North (hereinafter "N") and the antenna reference direction is the azimuth of the antenna 102 ($A_A$) and is unknown. In addition and in this example, the interfering source 112 is a jammer and an angle between N and the jammer is the azimuth of the jammer ($A_J$) and is also unknown.

In operation, the active null and beam steering subsystem 116 operates in a known manner to steer a first null beam in the direction of a transmitting device 110 having a known location which in this example is a GNSS satellite. Specifically, the active null and beam steering subsystem 116 steers the first null beam in the direction of the GNSS satellite based on a GNSS satellite signal transmitted by the GNSS satellite. After steering the first null beam towards the GNSS satellite, the calculation subsystem 122 measures the angle from the antenna reference direction to the first null beam ($\alpha_{S1}$). Specifically, the calculation subsystem 122 measures the angular distance, $\alpha_{S1}$, from the antenna reference direction to the first null beam steered in the direction of the GNSS satellite.

The calculation subsystem 122 then calculates the azimuth of the antenna 102, $A_A$, based on the measured angle to the first null beam, $\alpha_{S1}$, and a known absolute bearing of the GNSS satellite, $AB_X$. The absolute bearing of the GNSS satellite is known, for example, based on the ephemeris data received from the GNSS satellite. Specifically, the calculation subsystem 122 subtracts the measured angle to the first null beam, $\alpha_{S1}$, from the known absolute bearing of the GNSS satellite, $AB_X$. If the calculated azimuth of the antenna 102, $A_A$, is a positive value, then the calculated azimuth of the antenna 102, $A_A$, is the absolute bearing of the antenna 102. However, if the calculated azimuth of the antenna 102, $A_A$, is a negative value, then the absolute bearing of the antenna is 360° minus the absolute value of the calculated azimuth of the antenna 102, $A_A$.

For example, and with reference to FIG. 2, the first null beam is steered in the direction of the GNSS satellite based on the GNSS satellite signal transmitted by the GNSS satellite, and the angle from the antenna reference direction to the first null beam, $\alpha_{S1}$, is measured by the calculation subsystem 122 to be −20°. In addition, and with reference to FIG. 2, the absolute bearing of the GNSS satellite, $AB_X$, is known to be 42° based on the ephemeris data received from the GNSS satellite. The calculation subsystem 122 may then calculate the azimuth of the antenna 102, $A_A$, to be 62°, and specifically 42° minus −20°. The calculated azimuth of the antenna 102, in this example, indicates that the antenna reference direction of the antenna 102 is 62° to the right of N. As such, the absolute bearing of the antenna is 62°.

In addition, the active null and beam steering subsystem 116 operates in a known manner to steer a second null beam in the direction of an interfering source 112 that in this example is a jammer. Specifically, the active null and beam steering subsystem 116 steers the second null beam in the direction of the jammer based on a jamming signal produced by the jammer. The calculation subsystem 122 then measures the angle from the antenna reference direction to the second null beam, $\alpha_{S2}$. The calculation subsystem 122 then calculates the azimuth of the jammer, $A_J$, based on the measured angle to the second null beam, $\alpha_{S2}$, and the previously calculated azimuth of the antenna, $A_A$. Specifically, the azimuth of the jammer, $A_J$, is the sum of the previously calculated azimuth of the antenna $A_A$, and the measured angle to the second null beam, $\alpha_{S2}$. If the calculated azimuth of the jammer, $A_J$, is a positive value, then the calculated azimuth of the jammer, $A_J$, is the absolute bearing of the jammer. However, if the calculated azimuth of the jammer, $A_J$, is a negative value, then the absolute bearing of the jammer is 360° minus the absolute value of the calculated azimuth of the jammer, $A_J$. The measured, known, and/or calculated values may be stored at the GNSS receiver 108 and/or provided (e.g., broadcast) to the base station 124.

For example, and with reference to FIG. 2, the second null beam is steered in the direction of the jammer based on the jamming signal produced by the jammer, and the angle from the antenna reference direction to the second null beam, $\alpha_{S2}$, is measured by the calculation subsystem 122 to be −80°. In addition, and as previous calculated, the azimuth of the antenna, $A_A$, is 62°. Thus, the azimuth of the jammer, $A_J$, is calculated to be −18°, and specifically −80° plus 62°. The calculated azimuth of the jammer, $A_J$, in this example, indicates that the jammer is 18° to the left of N. As such, the absolute bearing of the jammer is 342°, and specifically 360° minus 18°.

The following chart includes the measured, known, and calculated values as described above with respect to FIG. 2:

$\alpha_{S1} = -20°$
$AB_X = 42°$
$A_A (AB_X - \alpha_{S1}) = 62°$
$\alpha_{S2} = -80°$
$A_J (A_A + \alpha_{S2}) = -18°$ It is noted that the values utilized in the example above are simply for illustrative purposes and that the jammer, the antenna reference direction, and the GNSS satellite may be located anywhere with respect to N and similar measurement and calculations may be performed to calculate the azimuth of the antenna and jammer utilizing the two null beams that are respectively steered in the direction of the GNSS satellite and the jammer.

Although the example as described with respect to FIG. 2 makes reference to the interfering source 112 being a jammer and the second null beam being steered in the direction of the jammer, it is expressly contemplated that in an alternative embodiment the interfering source 112 may be a reflector and the second null beam may be steered in the direction of the reflector producing one or more multipath signals. Specifically, and based on the timing of receipt and/or angle of incidence of the multipath signal being different than that of a direct path signal, the system may steer the second null beam in the direction of the reflector and the system determines the azimuth of the reflector in the manner described above with reference to FIG. 2.

In addition and although the example as described with respect to FIG. 2 makes reference to steering the first null beam in the direction of a GNSS satellite, it is expressly contemplated that the first null beam may be steered in the direction of a source of a signal of opportunity. The system may then calculate the azimuth of the reflector or jammer utilizing the second null beam that is steered in the direction of the jammer or reflector, as described above.

In a further alternative embodiment, the first null beam may be steered in a direction of a source of a signal of opportunity, and the second null beam may be steered in the direction of the interfering source 112 that is a spoofer producing one or more spoofing signals. Specifically, the system determines that the second null beam is steered in the direction of the spoofer when the GNSS receiver is no longer able to perform position calculations utilizing the spoofing signals due to the second null beam being steered in the direction of the spoofer producing the spoofing signals. The system then calculates the azimuth of the spoofer in the manner described above with reference to FIG. 2.

Figure 3:
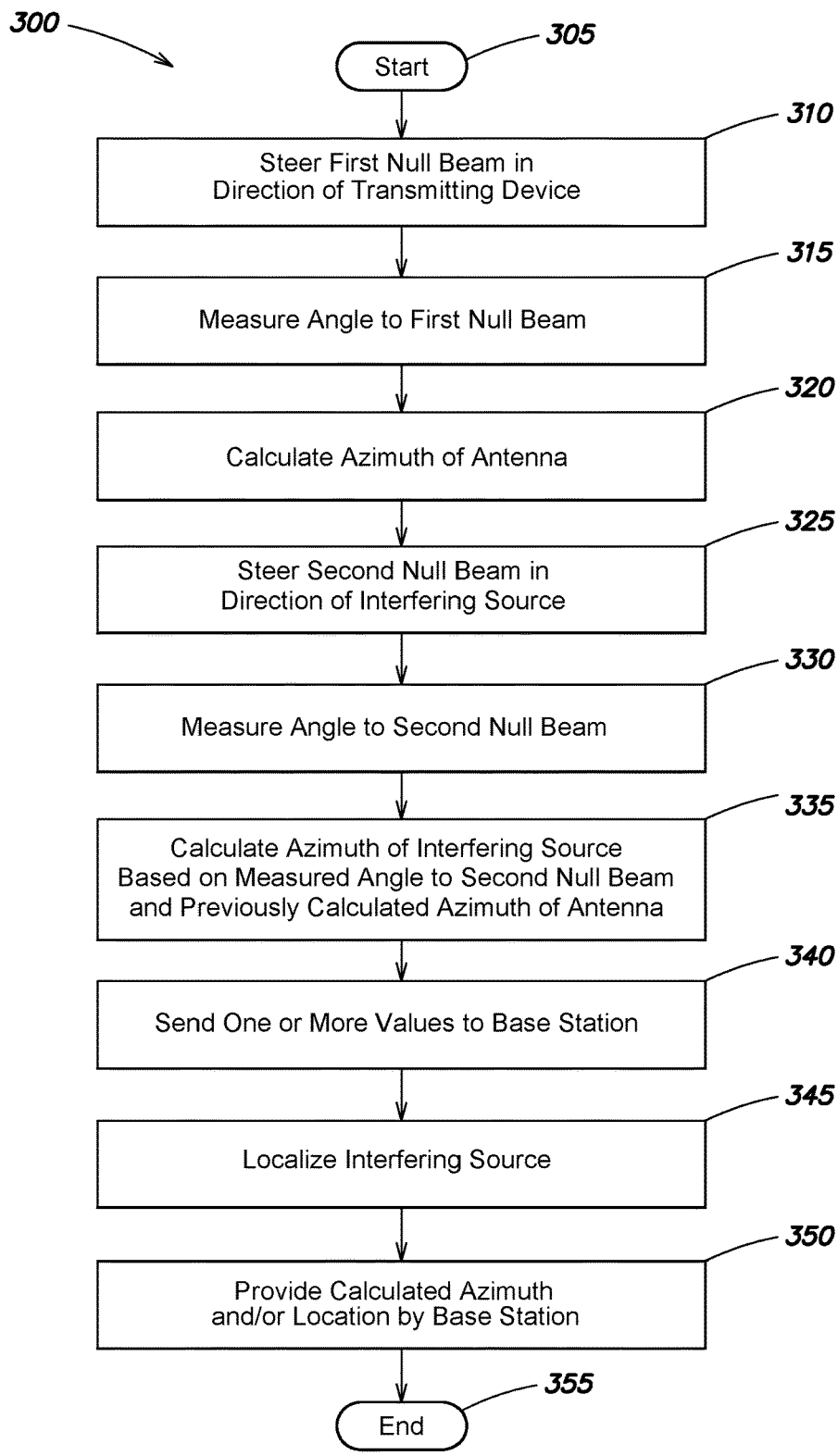
FIG. 3 is an exemplary flow chart for the operation of the systems of FIG. 1.

FIG. 3 is an exemplary flow chart of the operations of the system for calculating the azimuth of the interfering source. The procedure 300 starts at step 305 and continues to step 310, where the system steers a first null beam in the direction of a transmitting device. For example, the first null beam may be steered in the direction of a GNSS satellite having a known location and based on a GNSS satellite signal transmitted by the GNSS satellite, or in the direction of source of a signal of opportunity having a known location and based on a signal of opportunity transmitted by the source. Specifically, the active null and beam steering subsystem 116 operates in a known manner to steer a first null beam in the direction of the transmitting device. At step 315, the system measures an angle to the first null beam. Specifically, the calculation subsystem 122 measures an angle from the antenna reference direction to the first null beam.

At step 320, the system calculates the azimuth of the antenna. Specifically, the calculation subsystem 122 calculates the azimuth of the antenna 102 based on the measured angle from the antenna reference direction to the first null beam and the known absolute bearing of the transmitting device. More specifically, the calculation subsystem 122 subtracts the measured angle from the absolute bearing of the transmitting device to calculate the azimuth of the antenna 102. The absolute bearing of a GNSS satellite is known based on the ephemeris data provided by the GNSS satellite and/or the absolute bearing of the source of the signal of opportunity is known based on the properties of the signals of opportunity. If the calculated azimuth of the antenna 102 is a positive value, then the calculated azimuth of the antenna is the absolute bearing of the antenna 102. However, if the calculated azimuth of the antenna 102 is a negative value, then the absolute bearing of the antenna 102 is 360° minus the absolute value of the calculated azimuth of the antenna 102.

At step 325, the system steers a second null beam in the direction of an interfering source 112 based on interfering signals produced and provided by the interfering source 112. Specifically, the active null and beam steering subsystem 116 operates in a known manner to steer a second null beam in the direction of the interfering source 112. For example, the interfering source 112 may be a jammer producing one or more jamming signals, a reflector producing one or more multipath signals, or a spoofer producing one or more spoofing signals that disrupt the operations of the GNSS receiver and adversely affect position calculations. At step 330, the system measures the angle to the second null beam. Specifically, the calculation subsystem 122 measures the angle from the antenna reference direction to the second null beam.

At step 335, the system calculates the azimuth of the interfering source based on the measured angle from the antenna reference direction to the second null beam and the previously calculated azimuth of the antenna. Specifically, the calculation subsystem 122 calculates the azimuth of the interfering source 112 by adding the measured angle from the antenna reference direction to the second null beam and the azimuth of the antenna 102. If the calculated azimuth of the interfering source 112 is a positive value, then the calculated azimuth of the interfering source 112 is the absolute bearing of the interfering source 112. However, if the azimuth of the interfering source 112 is a negative value, then the absolute bearing of the interfering source 112 is 360° minus the absolute value of the azimuth of the interfering source 112.

At step 340, one or more values are provided to the base station 124. The values may include, but are not limited to, the calculated azimuth and/or absolute bearing of the antenna 102, the calculated azimuth and/or absolute bearing of the interfering source 112, and/or the measured angles. It is noted that the base station 124 may store these values in table 400.

In certain embodiments, and at step 345, the interfering source 112 may be localized. Specifically, it is noted that the base station 124 may calculate the position of the interfering source 112 based on the values received from the GNSS receiver 108. If the interfering source 112 is stationary, the base station 124 may receive the position of the same GNSS receiver 108 at two different positions relative to the interfering source 112 (at different epoch times), the azimuth of the receiver at each epoch, and the angle from the receiver for each epoch to the interfering source 112 (e.g., $\alpha_{S1}$). Triangulation may then be utilized, in a known manner, to determine the x and y position coordinates of the interfering source 112.

Alternatively, the base station 124 may receive the position of two different GNSS receivers that are stationary, the azimuth of each GNSS receiver, and the angle from each GNSS receiver to the interfering source 112 (e.g., $\alpha_{S1}$). Triangulation may then be utilized, in a known manner, to determine the x and y position coordinates of the interfering source 112.

In certain embodiments, and at step 350, the calculated azimuth and/or location of the interfering source may be provided by the base station 124. Specifically, the base station 124 may broadcast the calculated azimuth of the interfering source 112 and/or the location of the interfering source 112 to one or more other GNSS receivers. In addition, the base station 124 may broadcast other information, such as information about the interfering source (e.g., frequency, bandwidth, velocity, etc.), to one or more other GNSS receivers. For example, the base station 124 may broadcast the azimuth of the interfering source 112, the location of the interfering source 112, and/or the other information to other GNSS receivers in one or more RTK correction messages and/or one or more PPP correction messages. Advantageously, the other GNSS receivers may utilize the received information to avoid selecting and/or utilizing particular GNSS satellites and/or a source of a signal of opportunity located in the region/location of the interfering source 112. In addition, the GNSS receivers may utilize the received information to avoid traveling to the region/location of the interfering source 112. In addition or alternatively, the azimuth of the interfering source and/or the location of the interfering source may be provided by the base station 124 to other entities, such as law enforcement, such that the other entities may locate and disable the interfering source 112. At step 355, the procedure ends.

Figure 4:
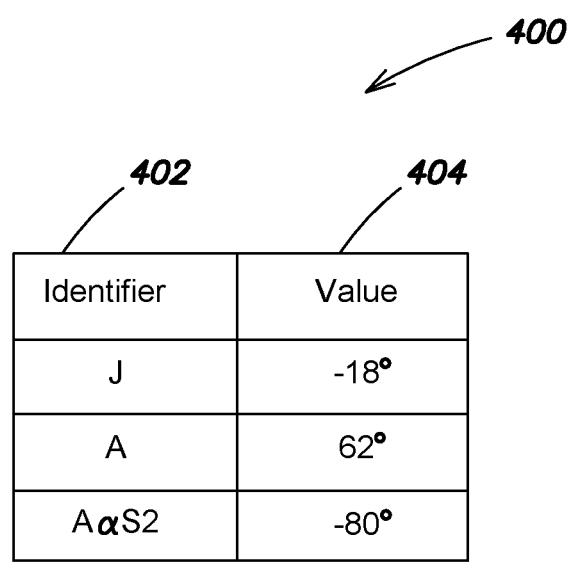
FIG. 4 illustrates an exemplary table that may store values associated with the operation of the system of FIG. 1.

FIG. 4 is an exemplary table 400 that may store one or more values associated with the embodiments described herein. Table 400 may be stored in the storage repository 128 of the base station 124. It should be noted that the use of a table is for illustrative purposes, and in alternative embodiments a different data container or structure may be utilized. The table 400 may include an identifier column 402 and a value column 404. Specifically, the identifier column 402 may store an identifier of an interfering source 112, while the corresponding entry in the value column 404 may store a calculated value, such as the azimuth/absolute bearing of the interfering source 112.

For example, and with reference to FIG. 4, table 400 may store the values measured or calculated with reference to FIG. 2. Specifically, a jammer identifier of "J", for the interfering source 112, may be stored in identifier column 402 and the azimuth of jammer, calculated as −18°, may be stored in the corresponding entry in value column 404. It is expressly contemplated that other values as described above and with reference to reference to FIG. 2 may be stored in table 400. Specifically, an identifier of the antenna, the azimuth of the antenna, and the measured angle from the antenna reference direction to the jammer may be stored in table 400. For example, an antenna identifier of "A", for antenna 102, may be stored in identifier column 402 and the azimuth of antenna 102, calculated as 62°, may be stored in the corresponding entry in value column 404. In addition, identifier A$\alpha_{S2}$ may be stored in identifier column 402 and the measured angle to the jammer, calculated as −80°, may be stored in the corresponding entry in value column 404. As such, and as described above, the base station 124 may utilize these values to localize the jammer such that the position of the jammer may be provided to other entities (e.g., law enforcement) to find and disable the jammer.

The foregoing description described certain example embodiments. It will be apparent, however, that other variations and modifications may be made to the described embodiments, with the attainment of some or all of their advantages. For example, although reference is made to the active null and beam steering subsystem 116 and the calculation subsystem 122 being a part of the GNSS receiver 108, it is expressly contemplated that the active null and beam steering subsystem 116 and the calculation subsystem 122 may be part of the base station 124 or may be part of a stand-alone system (not shown) that performs the functions associated with the one or more embodiments described herein.

Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A system, comprising:
   an antenna having a plurality of antenna elements, the plurality of antenna elements configured to receive one or more signals from one or more global navigation satellite system (GNSS) satellites; and
   a GNSS receiver having a processor and a memory, the processor configured to:
      steer a first null beam in a direction of a transmitting device having a known location,
      measure a first angle to the first null beam,
      calculate an azimuth of the antenna based on the measured first angle to the first null beam and an absolute bearing of the transmitting device,
      steer a second null beam in a direction of an interfering source based on an interfering signal produced by the interfering source,
      measure a second angle to the second null beam, and
      calculate an azimuth of the interfering source based on the measured second angle to the second null beam and the calculated azimuth of the antenna.

2. The system of claim 1, wherein the antenna is controlled radiation pattern antenna.

3. The system of claim 1, wherein the transmitting device is a selected GNSS satellite, and wherein the interfering source is a jammer producing one or more jamming signals or a reflector producing one or more multipath signals.

4. The system of claim 1, wherein the measured first angle is subtracted from the absolute bearing of the transmitting device to calculate the azimuth of the antenna.

5. The system of claim 1, wherein the transmitting device is a source transmitting a signal of opportunity, and wherein the interfering source is a jammer producing one or more jamming signals or a reflector producing one or more multipath signals.

6. The system of claim 1, wherein the measured first angle is measured from an antenna reference direction of the antenna to the first null beam steered to the transmitting device and the measured second angle is measured from the antenna reference direction of the antenna to the second null beam steered to the interfering source.

7. The system of claim 1, wherein the measured second angle is added to the calculated azimuth of the antenna to calculate the azimuth of the interfering source.

8. The system of claim 1, wherein the transmitting device is a source of a signal of opportunity and the interfering source is a spoofer producing one or more spoofing signals.

9. A method comprising:
receiving, at an antenna having one or more antenna elements, one or more signals from one or more global navigation satellite system (GNSS) satellites;
steering, by a GNSS receiver coupled to the antenna, a first null beam to a transmitting device having a known location;
measuring a first angle from an antenna reference direction of the antenna to the first null beam steered to the transmitting device having a known location;
calculating an azimuth of the antenna based on the measured first angle and an absolute bearing of the transmitting device;
steering a second null beam to an interfering source producing an interfering signal;
measuring a second angle from the antenna reference direction to the second null beam; and
calculating, by the GNSS receiver, an azimuth of the interfering source based on the measured second angle and the calculated azimuth of the antenna.

10. The method of claim 9 wherein the transmitting device is a selected GNSS satellite, and wherein the interfering source is a jammer producing one or more jamming signals or a reflector producing one or more multipath signals.

11. The method of claim 9 wherein the transmitting device is a source transmitting a signal of opportunity, and wherein the interfering source is a jammer producing one or more jamming signals or a reflector producing one or more multipath signals.

12. The method of claim 9, wherein the antenna is controlled radiation pattern antenna.

13. The method of claim 9, wherein the transmitting device is a source transmitting a signal of opportunity, and wherein the interfering source is a spoofer producing one or more spoofing signals.

14. The method of claim 9, wherein the measured first angle is subtracted from the absolute bearing of the transmitting device to calculate the azimuth of the antenna.

15. The method of claim 9, wherein the measured second angle is added to the azimuth of the antenna to calculate the azimuth of the interfering source.

16. A base station, comprising:
a memory;
processing logic configured to:
receive, from a global navigation satellite system (GNSS) receiver, an azimuth of an interfering source wherein the azimuth of the interfering source is determined based on a first null beam steered to a GNSS satellite or a source transmitting a signal of opportunity, and a second null beam steered to the interfering source producing an interfering signal, and
broadcast one or more messages to one or more other GNSS receivers, wherein the one or more messages include the azimuth of the interfering source.

17. The base station of claim 16, wherein the interfering source is one of a jammer producing one or more jamming signals, a reflector producing one or more multipath signals, and a spoofer producing one or more spoofing signals.

18. The base station of claim 16, wherein the processing logic is further configured to:
transmit one or more Real Time Kinematics (RTK) correction messages to the one or more other GNSS receivers, wherein the one or more RTK correction messages include the azimuth of the interfering source, or
transmit one or more Precise Point Positioning (PPP) correction messages to the one or more other GNSS receivers, wherein the one or more PPP correction messages include the azimuth of the interfering source.

19. The base station of claim 16, wherein the processing logic is further configured to:
receive from the GNSS receiver first information that includes at least an azimuth of the GNSS receiver, a first measured angle to the interfering source, and a location of the GNSS receiver,
receive from each of the one or more other GNSS receivers second information that includes at least an azimuth of the other GNSS receiver, a second measured angle to the interfering source, and a location of the other GNSS receiver,
determine a location of the interfering source based on the first information and the second information, and
send the location of the interfering source to the GNSS receiver or the one or more other GNSS receivers.

20. The base station of claim 16, wherein the azimuth of the interfering source is calculated based on an azimuth of an antenna coupled to the GNSS receiver and a measured angle from an antenna reference direction of the antenna to the second null beam.

21. A method, comprising:
receiving, at a base station and from a global navigation satellite system (GNSS) receiver, an azimuth of an interfering source wherein the azimuth of the interfering source is determined based on a first null beam steered to a GNSS satellite or a source transmitting a signal of opportunity, and a second null beam steered to the interfering source producing an interfering signal, and
broadcasting, by the base station, one or more messages to one or more other GNSS receivers, wherein the one or more messages include the azimuth of the interfering source.

22. The method of claim 21, wherein the interfering source is one of a jammer producing one or more jamming signals, a reflector producing one or more multipath signals, and a spoofer producing one or more spoofing signals.

23. The method of claim 21, further comprising:
transmitting, by the base station, one or more Real Time Kinematics (RTK) correction messages to the one or more other GNSS receivers, wherein the one or more RTK correction messages include the azimuth of the interfering source, or transmitting, by the base station, one or more Precise Point Positioning (PPP) correction messages to the one or more other GNSS receivers, wherein the one or more PPP correction messages include the azimuth of the interfering source.

24. The method of claim 21, further comprising:

receiving, at the base station and from the GNSS receiver, first information that includes at least an azimuth of the GNSS receiver, a first measured angle to the interfering source, and a location of the GNSS receiver, receiving, at the base station and from each of the one or more other GNSS receivers, second information that includes at least an azimuth of the other GNSS receiver, a second measured angle to the interfering source, and a location of the other GNSS receiver, determining, at the base station, a location of the interfering source based on the first information and the second information, and sending, by the base station, the location of the interfering source to the GNSS receiver or the one or more other GNSS receivers.

25. The method of claim 21, wherein the azimuth of the interfering source is calculated based on an azimuth of an antenna coupled to the GNSS receiver and a measured angle from an antenna reference direction of the antenna to the second null beam.

* * * * *